United States Patent [19]

Matsubara et al.

[11] 4,035,436

[45] July 12, 1977

[54] ADHESIVE COMPOSITIONS FOR METALS

[75] Inventors: Takashi Matsubara; Yoshihito Uramoto; Daizo Matsuoka, all of Nagoya, Japan

[73] Assignee: Toagosei Chemical Industry Co., Ltd., Tokyo, Japan

[21] Appl. No.: 631,249

[22] Filed: Nov. 12, 1975

[30] Foreign Application Priority Data

Nov. 12, 1974 Japan .............................. 49-129519
Nov. 22, 1974 Japan .............................. 49-133525

[51] Int. Cl.² ........................................ C08L 77/00
[52] U.S. Cl. ....................... 260/857 TW; 428/416; 156/218; 156/331; 156/315; 260/857 L; 427/410; 428/458; 428/418; 428/474
[58] Field of Search .......... 156/331, 330, 315, 309, 156/218, 311; 427/327, 405, 386, 410, 388 A; 428/416, 458, 418, 474; 260/857 TW, 857 L; 220/67, 75

[56] References Cited

U.S. PATENT DOCUMENTS

| 2,970,077 | 1/1961 | Groves | 156/330 |
|---|---|---|---|
| 3,351,504 | 11/1967 | De Hart | 427/405 |
| 3,373,224 | 3/1968 | Mesrobian et al. | 260/857 L |
| 3,632,790 | 1/1972 | Naarmann | 260/857 L |
| 3,703,434 | 11/1972 | Schaaf | 427/386 |
| 3,773,589 | 11/1973 | Kaiser et al. | 156/330 |
| 3,833,442 | 9/1974 | Russell et al. | 156/331 |
| 3,845,163 | 10/1974 | Murch | 260/857 L |
| 3,921,847 | 11/1975 | Rentmeester | 156/315 |
| 3,936,342 | 2/1976 | Matsubara et al. | 156/330 |

*Primary Examiner*—Charles E. Van Horn
*Assistant Examiner*—J. J. Gallagher
*Attorney, Agent, or Firm*—Sughrue, Rothwell, Mion, Zinn & Macpeak

[57] ABSTRACT

A nylon-base adhesive composition for metals is composed of 100 parts by weight of a mixture of nylon 11 and nylon 12 and about 2-40 parts by weight of nylon 6-12. The adhesive composition has excellent heat resistance and water resistance and is particularly useful for making cans. The properties of the adhesive composition can be further improved by adding thereto polyethylene, an ionomer, or a mixture thereof.

A process for bonding steel sheets using the adhesive is also disclosed.

11 Claims, No Drawings

ADHESIVE COMPOSITIONS FOR METALS

BACKGROUND OF THE INVENTION

1. Field of the Invention

The present invention relates to a novel nylon-base adhesive composition for metals providing excellent adhesion and having high heat resistance and high water resistance, more particularly, it relates to a nylon-base adhesive composition suitably used for manufacturing cans as an adhesive for the side seam of a can. The invention further relates to a method of bonding metals using the aforesaid nylon-base adhesive composition.

2. Description of Prior Art

Nylon-base adhesives have been used for bonding metals and, in particular have been used for the adhesion of the side seam of a can in can manufacture. That is, various nylon-base adhesives have been proposed as side seam adhesives for can manufacture. For example, crystalline nylon adhesives (Japanese Patent Publication No. 32359/70, copolymeric nylon adhesives (Japanese Patent Publication No. 16790/74, etc.), a mixture of crystalline nylon and copolymeric nylon (Japanese Patent Publication No. 18096/73 and Patent Application Laid Open 25039/73), and a blend of crystalline nylon and an ethylene-ethyl acrylate copolymer (U.S. Pat. No. 3,819,473). However, these adhesives are essentially inferior in water resistance, and thus their use has been restricted to some extent.

SUMMARY OF THE INVENTION

As a result of extensive research on nylon-base adhesives showing high heat resistance and high water resistance, the inventors have succeeded in obtaining the excellent nylon-base adhesive composition of this invention.

One object of this invention is, therefore, to provide an improved nylon-base adhesive composition for metals which is capable of providing high adhesion and which has high heat resistance and high water resistance even at high temperatures.

Another object of this invention is to provide a nylon-base adhesive composition for metals which is capable of providing high adhesion between metals by pressing and heating them for only a short period of time.

A particular object of this invention is to provide an improved adhesive composition suitably used for manufacturing cans as a side seam adhesive.

Still another object of this invention is to provide a method of bonding metals using the aforesaid adhesive composition.

According to this invention there is provided an adhesive composition for metals comprising a blend of 100 parts by weight of a mixture of nylon 11 (11-aminoundecanic acid polymer) and nylon 12 (12-aminododecanic acid polymer) in an amount of about 95 to 5 parts of nylon 11 to about 5 to 95 parts of nylon 12, weight parts, and about 2 to 40 parts by weight of nylon 6–12.

The adhesive composition of this invention is useful, for example, for the adhesion of side seams of cans in can manufacturing. In particular, since the nylon-base adhesive composition of this invention is superior in heat resistance and water resistance to conventional nylon-base adhesive compositions, it can be used for manufacturing cans as a side seam adhesive not only in fields requiring no high-temperature sterilization, such as of beer, soft drink, etc., containers, but also in fields requiring retort sterilization, such as containers for juice, milk, fermented drinks, marine products, agricultural products, processed goods, etc.

DESCRIPTION OF THE PREFERRED EMBODIMENTS

Nylon 11 as is used in this invention can be represented by the general formula $+NH+CH_2)_{10}CO+_n$. It is prepared industrially by polymerizing 11-aminoundecanoic acid while heating. The preferred polymerization degree of the polymer is as follows: It is important that the relative viscosity ($\eta \gamma$) of the polymer measured at 25° C. in 100 ml of cresol having dissolved therein 0.4 g of the polymer be from about 1.3 to about 2.5, preferably from 1.5 to 1.8.

On the other hand, nylon 12 as is used in this invention can be represented by the general formula $+NH+NH_2)_{11}CO+_n$. It is prepared industrially by subjecting ω-lauryllactam to a ring-opening polymerization in the presence of water or by polymerizing 12-aminododecanic acid while heating. The preferred polymerization degree of the polymer is as follows. It is important that the relative viscosity ($\eta \gamma$) of the polymer measured at 25° C in 100 ml of cresol having dissolved therein 0.4 g of the polymer be from about 1.3 to about 2.5, preferably from 1.5 to 1.8.

It is especially preferred that the nylon 11 and nylon 12 used in this invention be 100% homonylons, but each of the nylons can have other polyamide-forming repeating units, so long as such other polyamide-forming repeating units are present in an amount less than about 5% by weight, based on the weight of the nylon 11 or nylon 12. For example, in this invention nylon 11 can be modified with nylon 12 in an amount of less than about 5% by weight, and nylon 12 can be modified with nylon 11 in an amount of less than about 5% by weight.

In this case, the copolymeric component employed in the nylon is required not to reduce the crystalline property of the copolymer to outside of that as established in the later given test. As copolymerizable polyamide-forming repeating units which do not greatly reduce the crystalline property of the copolymer, there are repeating units represented by the following general formulae:

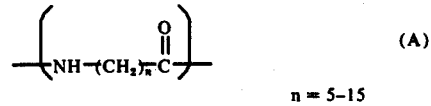

(A)

n = 5–15

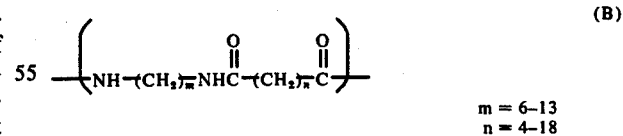

(B)

m = 6–13
n = 4–18

The repeating unit of general formula (A) is the repeating unit of ω-aminoacid or ω-lactam, and the repeating unit of general formula (B) is the repeating unit of a nylon salt prepared from a straight-chain aliphatic α,ω-diamine and an α,ω-aliphatic dibasic acid.

The crystallizable nylons used in this invention are preferably those which, when annealled for more than 6 hours at a temperature 50° C lower than the melting point of the samples, do not undergo thermal degradation, and when the resulting samples are heated at a rate of 10° C/mins using a DSC (Differential Scanning Calorimeter) a distict endothermic peak exists (the temperature difference between before and after the endothermic action).

Specific examples of the preferred repeating units shown by general formula (A) are a 6-aminocapronic acid polymer unit ($n = 5$), a 7-aminoheptanic acid polymer unit ($n = 6$), an 8-aminocaprylic acid polymer unit ($n = 7$), a 10-aminodecanic acid polymer unit ($n = 0$), an 11-aminoundecanic acid polymer unit ($n = 10$), a 12-aminododecanoic acid polymer unit ($n = 11$), and a 12-aminotridecanoic acid polymer unit ($n = 12$).

Specific examples of the preferred repeating units shown by general formula (B) are a hexamethyleneadipamide polymer unit ($m = 6, n = 4$), a hexamethyleneazelamide polymer unit ($m = 6, n = 7$), a hexamethylenesebacamide polymer unit ($m = 6, n = 8$), a hexamethylenedodecamide polymer unit ($m = 6, n = 10$), a hexamethylenetridecamide polymer unit ($m = 6, n = 11$), a decamethyleneadipamide polymer unit ($m = 10, n = 4$), a decamethyleneazelamide polymer unit ($m = 10, n = 7$), a decamethylenesebacamide polymer unit ($m = 10, n = 8$), a decamethylenedodecamide polymer unit ($m = 10, n = 10$), a decamethylenetridecamide polymer unit ($m = 10, n = 11$), a dodecamethyleneadipamide polymer ($m = 12, n = 4$), a dodecamethyleneazelamide polymer unit ($m = 12, n = 7$), a dodecamethylenesebacamide polymer unit ($m = 12, n = 8$), a dodecamethylenedodecamide polymer unit ($m = 12, n = 10$), and a dodecamethylenetridecamide polymer unit ($m = 12, n = 11$).

The polymer units illustrated above may be employed individually or as a combination thereof. When used, the proportion of the above-described polyamide repeating units other than the principal repeating unit is from less than about 5% by weight, preferably from 1.5% to 4% by weight, of the 11-aminoundecanoic acid repeating unit or the 12-aminododecanoic acid repeating unit.

The copolymeric component as illustrated above can be copolymerized with the primary component by a random copolymerization or by a partial block copolymerization by amide exchange.

Since the copolymer used in this invention is required to be crystalline as mentioned above, it is necessary that the copolymer does not contain a large amount of a polyamide-forming repeating unit having a side chain, such as trimethylhexamethylene diamide or a cyclic dibasic acid such as a dimeric acid or trimeric acid of an unsaturated fatty acid, which has a harmful influence on the crystalline property of the copolymer as defined by the earlier given test. Also, it is desirable that the melting point depression of the aforesaid copolymer of nylon 12 or copolymer of nylon 11 used in this invention be within about 10° C, more preferably within 5° C, of the melting point of each homopolymer, and it is also desirable that the heat of dissolution of the crystals of a copolymer sample having the same heat history as each homopolymer or (homonylon) be greater than 80% that of the homopolymer.

Nylon 6–12 as is used in this invention as another component for the adhesive composition can be represented by the general formula:

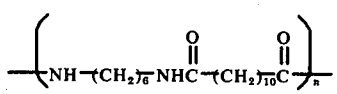

It is prepared industrially by polycondensing 1,6-hexamethylenediamine and 1,12-dodecanedioic acid while heating. The polymer preferably has a polymerization degree such that the relative viscosity ($\eta\gamma$) measured at 25° C in 100 ml of m-cresol having dissolved therein 0.4 g of the polymer is from about 1.3 to about 2.5, more preferably from 1.5 to 1.8.

Moreover, nylon 6–12 may also contain the additional polyamide-forming repeating units as stated above in connection with the nylon 11 and nylon 12 in an amount which has no harmful influence on the crystalline properties of the polymer. That is, in such cases, the proportion of the addition copolymeric component is less than about 10%, preferably less than 5%, by weight of the main component.

In the present invention, it is necessary that the component ratio of nylon 11 to nylon 12 be from about 95/5 to about 5/95 by weight ratio, preferably from 80/20 to 30/70 by weight ratio, and further the compounding ratio of nylon 6–12 to 100 parts by weight of a mixture of nylon 11 and nylon 12 is about 2 to about 40 parts by weight, preferably 5–30 parts by weight.

The adhesive composition of this invention as described above may further contain another polyamide(s), e.g., nylon 6/6-6, nylon 6/6-6/6-10, polymerized fatty acid polyamides, etc., polyethylene(s) and an ionomer, individually or as a mixture thereof, as a 4th component.

It is preferred that the polyethylene used in this invention as the 4th component have a specific gravity of about 0.92 to about 0.96, a mean molecular weight of about 20,000 to about 80,000, and a softening point of about 90 to about 130° C. The content of such a polyethylene is about 0.1 to about 20 parts by weight, preferably 0.3 to 15 parts by weight, per 100 parts by weight of the mixture of nylon 11, nylon 12, and nylon 6-12.

If the content of polyethylene is less than 0.1 part by weight, the adhesive strength of the bonded assembly at 100° C after aging in water for 3 hours at 130° C will be reduced, while if the proportion of polyethylene is over 20 parts by weight, the adhesive strength of the bonded assembly at low temperatures and high temperatures will be reduced.

The addition of the ionomer as the 4th component can further improve the weldability of the adhesive composition to metals at low temperatures. Examples of ionomers suitably used in this invention for the aforesaid purpose are Surlyn 1555, 1560, 1601, 1605, AD-8109, and 1707, which have been cross-linked with sodium ions and Surlyn 1650, 1652, AD-8102, and 1706, which have been cross-linked with zinc ions (all trade names, made by E. I. Du Pont de Nemours & Co.). It is desirable that the ionomer used in this invention have a density of 0.94 to 0.96 g/cm$^2$, a Vicat softening point (ASTM D1528) of 59 to 85° C, and a melt index (ASTM D 1238) of 0.7 to 360.

The proportion of the ionomer is 0.1 to 20 parts by weight, preferably 0.3 to 10 parts by weight, per 100 parts by weight of the mixture of nylon 11, nylon 12, and nylon 6-12. If the content of the ionomer is less than 0.1 part by weight, sufficient effects due to the ionomer cannot be expected, while if the content of the ionomer is over 20 parts by weight, the adhesive strength of the bonded assembly at normal temperature and high temperatures will be greatly reduced.

The adhesive composition of this invention can be prepared in a conventional manner, for example, by mixing and melting the polyamide mixture prepared beforehand using a melt extruder equipped with a motionless mixer and then extruding the molten mixture into cords or tapes.

The adhesive composition of this invention can be used for bonding metals having any desired shape. For example, a film, tape, powder, etc., of the adhesive composition of this invention is applied to the portion of a metal to be bonded, the adhesive is sandwiched in the molten state between metals, and the metal assembly is pressed and then cooled to solidify the adhesive and to bond the metals. In another method, the adhesive composition is applied in the molten state onto a metal plate, another metal plate is superposed on the layer of the molten adhesive, and the metal assembly is pressed while heating and then cooled to solidify the adhesive.

In any case, the bonding method of this invention is carried out by first heating the adhesive to a temperature which melts the nylons. In general, in the case of preparing samples, a film of the adhesive composition of about 30 to 250, preferably 50 to 100 microns thick, is sandwiched between samples pieces, the assembly is pressed for about 1/1000 to 60, preferably 1 to 10 seconds, by means of a press heated to about 200° to 330° C, preferably 240° to 300° C, and then the assembly is pressed by means of cooling plates to bond the sample pieces. The pressure applied is generally lower than several hundred $Kg/cm^2$, preferably lower than several ten $Kg/cm^2$. The above ranges are not to be considered limitative, merely illustrative.

In commercial can manufacturing, the side seam of a can body can be bonded in a short period of time (shorter than 2 seconds) by bumping the can body to be bonded (to which a film of the nylon adhesive of this invention has been welded beforehand) by means of a hot plate heated to a temperature over 260° C.

In the aforesaid methods, the nylon adhesive was melted by a hot plate, but other heating methods, such as high frequency heating and electric heating, can be also employed. For example, a film of the nylon adhesive can be welded to both portions of the metal plate to be bonded and, after contacting both portions with each other, the combination is heated by means of high frequency induction heating to melt the adhesive, whereafter bonding is instantaneously finished by bumping the bonded portion with a cooling plate which is at a low temperature.

It is advantageous that the adhesive composition of this invention be applied to the surface of a metal in film form of about 30 to 150 $\mu$ since in such a case the film applied to the metal surface shows high adhesivity to the surface, even at temperatures lower than the melting point of the film. Therefore, the adhesive composition of this invention permits the temporary bonding of the metal portions to each other, which makes it possible to finish the bonding with high precision.

The adhesive composition of this invention can be used to bond various kinds of metals such as, for example, iron or steel plates, aluminum plates, iron or steel plates plated with zinc, tin, chromium, nickel, aluminum, etc., and iron or steel plates the surface of which has been chemically treated with chromic acid or phosphoric acid or has been subjected to an electrolytic treatment, e.g., electroplating to a thickness of less than several microns.

The adhesive composition of this invention is particularly suitable for gluing the above-described metallic materials as well as chromium-plated steel plates, thin nickel-plated steel plates, steel plates treated with chromic acid, and untreated steel foils, which metallic plates having coated thereon a primer coating.

There are various kinds of chromic acid-treated steel plates or sheets, and for preparing these steel plates or sheets there are various methods, e.g., a method in which steel plates or sheets are electrolyzed at a proper electric current density in a bath prepared by adding to an aqueous $CrO_3$ solution having a comparatively low concentration (lower than 100 g/liter of $CrO_3$) of phenol disulfonic acid or catechol disulfonic acid or a salt thereof, or further a small amount of sulfuric acid, and a fluorine compound; a method in which steel plates or sheets are electrolyzed in an acqueous $CrO_3$ solution having a concentration of greater than 100 g/liter $CrO_3$, washed with water, and then electrolyzed in an aqueous $CrO_3$solution having a low concentration of $CrO_3$. Products sold under the trade names Hi-Top and Supercoat by Toyo Kohan K.K. belong to the former class and the product sold under the trade name Cansuper by Shin Nippon Seitetsu K.K. and the product sold under the trade name Weirchrome by National Steel Co. belong to the latter class. The plating layer of these products is composed of a very thin metallic chromium layer and a hydrated chromium oxide layer, and usually has a thickness of 0.05 to 2 $mg/dm^2$, as Cr. Recently, a steel sheet or plate having a thinner plating layer has been developed (chromic acid treated steel plate) where a steel plate is immersed in an aqueous solution containing $CrO_3$ and a reducing agent and, after withdrawing it, the steel plate is dried by heating, whereby only a layer of hydrated chromium oxide is formed on the surfaces of the steel plate. The product sold under the trade name Hinack by Nippon Kokan K.K. belongs to this type of steel plate.

It is preferred, to facilitate the adhesion of metal bases, that the metallic materials have a primer coating thereon.

As such a primer, a thermosetting type epoxy-phenol resin, a phenol resin, a epoxy-urea resin, an epoxy ester resin, and an epoxy-amino resin can be used. Specific examples of particularly suitable primers for the adhesive composition of this invention are a phenol-formaldehyde resin containing o- or p-cresol and phenol or o- or p-cresol, phenol, and bisphenol A as the phenol component and an epoxy-phenol resin composed of a bisphenol A type epoxy resin; see U.S. Pat. No. 3,663,354 for specific examples of such resins. Such a primer is usually coated at a thickness of 1 to 6 microns by means of, e.g., a roll coater, and then baked at 160° to 220° C for 5 to 10 minutes.

The aforesaid heat-setting type epoxy-phenol resin type primers are described in detail in the specification of U.S. Pat. Application Ser. No. 442,557, whose disclosure is hereby incorporated by reference. For example, the primer can be prepared by mixing one part by weight of a thermosetting phenolformaldehyde resin prepared by reacting a mixture of o-cresol and phenol in a 60/40 to 10/90 by weight ratio under refluing in the presence of an alkali catalyst and 0.1 to 2.5 parts by weight of a bisphenol A type epoxy resin having a mean molecular weight of greater than 800, preferably a 2,000 to 4,000. The primer is used as a uniform composition in a solvent.

The resin thus obtained is a resole type mixed phenolic resin having a mean molecular weight of 250 to 350, which is mainly composed of phenol nuclei and orthocresol nuclei, both being combined through a methylene bond or a methylether bond and having a terminal methylol group.

The bisphenol A type epoxy resin as used in this invention is a condensation polymer obtained by reacting epichlorohydrin with 2,2-bis (4'-hydroxyphenol) propane and having the following structural formula;

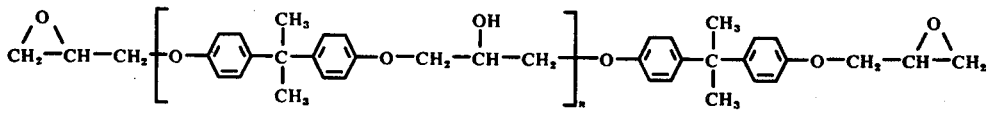

where n is such that the molecular weight of the bisphenol A type epoxy resin is within the above-described molecular weight range.

The mean molecular weight is the numeral mean molecular weight calculated from the epoxy equivalent.

Suitable examples of bisphenol A type epoxy resins having a mean molecular weight of more than about 800 are Epikote 828 (epoxy equivalent 182–194, hydroxyl group content 0.06, mean molecular weight 355), Epikote 1001 (epoxy equivalent 450–500, hydroxyl group content 0.29, mean molecular weight 900), Epikote 1004 (epoxy equivalent 900–1000, hydroxyl group content 0.33, mean molecular weight 1400), Epikote 1007 (epoxy equivalent 1750–2150, hydroxyl group content 0.36, mean molecular weight 2900), Epikote 1009 (epoxy equivalent 2400–3500, hydroxyl group content 0.40, mean molecular weight 3750), Epikote 1031 (epoxy equivalent 200–240, hydroxyl group content 0, mean molecular weight 703), trade names, produced by Shell Oil Co., Ltd., and Araldite 6097 (epoxy equivalent 1750–2150), trade name, produced by Ciba, Ltd.

The epoxy equivalent is the number of grams of the resin containing 1 g equivalent of epoxy groups. The hydroxyl group content is the number of OH groups in 100 g of the resin.

The curing of the thermosetting phenolic resin and bisphenol A type epoxy resin composition is carried out at about 180° to 300° C for about 30 sec. to 15 min., preferably at 210° to 280° C for 1 to 5 min.

Typical examples of solvents used in this invention include ketones such as acetone, methyl ethyl ketone, methyl isobutyl ketone, cyclohexanone, isophorone, etc.; aromatics such as benzene, toluene, xylene, etc.; cellosolves, such as ethylene glycol monomethyl ether, ethylene glycol ethyl ether, ethylene glycol butyl ether, etc.; esters such as ethylene glycol monomethyl ether acetate, ethylene glycol monoethyl ether acetate, etc.; and alcohols, such as n-butanol, diacetone alcohol, etc.

The invention will now be explained in more detail by the following examples, in which all parts are by weight. Further, the relative viscosity of any nylon in the examples was the value measured at 25° C in 100 ml of metacresol having dissolved therein 0.4 g of the nylon.

EXAMPLES 1 TO 4 AND COMPARISON EXAMPLES 1 AND 2

To 100 parts of a 6:4 (by weight ratio) mixture of nylon 11 (melting point 186° C, relative viscosity ($\eta\gamma$) 1.72, prepared by polymerizing 11-aminoundedecanoic acid while heating) and nylon 12 (melting point 176° C, relative viscosity ($\eta\gamma$) 1.68, prepared by the ring-opening polymerization of $\omega$-lauryllactam in the presence of water) there was added 0 to 50 parts of nylon 6–12 (melting point 215° C, relative viscosity ($\eta\gamma$) 1.68; the homopolyamide prepared by polycondensing an equimolar mixture of 1,6-hexamethylenediamine and 1,12-dodecanedioic acid in the amount as shown in Table 1), and the blend thus prepared was then fabricated into a film 100 $\mu$ thick by a film-molding means. To evaluate the adhesive strength and the heat resistance of the adhesive films this prepared, lacquered steel plates prepared by coating chromic acid-treated steel plates (Cansuper, a steel plate 0.17 mm thick, trade name of Sin Nihon Seitetsu K.K.) with a heat-setting epoxy-phenol resin coating (composed of a bisphenol A type epoxy resin and o-cresolphenolic resol resin; No. 3 primer in Example 1 of U.S. Ser. No. 442,597 now abandoned) at a thickness of 5 $\mu$ and curing the same by heating for 10 minutes at 200° C were used as test materials to be bonded.

Each of the nylon films having a width of 25 mm and a length of 50 mm was sandwiched between two lacquered steel plates of a width of 25 mm and a length of 100 mm, the assembly was pressed (at a pressure of 100 Kg/cm$^2$) for 3 seconds by means of hot plates at 280° C and immediately cooled under pressure to bond the steel plates. The samples thus prepared were allowed to stand overnight and then their T-friction strength was measured at 25° C and 100° C according to the test method of ASTM D1876-61T at a peeling rate of 200 mm/min. To evaluate the water resistance of the samples at high temperature, each sample was heated in water at 130° C for 3 hours and then the T-friction test carried out at 100° C. The results are shown in Table 1.

To determine the adhesion of the nylon films to metal plates at low temperature, the aforesaid lacquered steel plates were heated in a chamber maintained at 160° C, a nylon film having a thickness of 50$\mu$, a width of 5 mm, and a length of 50 mm was placed on the lacquered steel plate followed by pressing lightly by a roller, and the plate was cooled. Thereafter, the adhesion of the nylon film to the lacquered steel plate was measured. The results are shown in Table 1 as "low-temperature adhesivity test A", in which adhered cases and non-adhered cases are given.

EXAMPLES 5 AND 6 AND COMPARISON EXAMPLES 3 TO 6

The same procedure as Example 3 was repeated except that the mixing ratio of nylon 11 and nylon 12 was changed. The results are shown in Table 1. The weight ratio of nylon 11 to nylon 12 was 80:20 and 30:70 in Examples 5 and 6, respectively, whereas only nylon 11 or nylon 12 was used in Comparison Example 3 and Comparison Example 4, respectively, in place of the mixture of nylon 11 and nylon 12. Moreover, nylon 11 or nylon 12 was used individually without using nylon 6–12 in Comparison Example 5 and Comparison Example 6, respectively.

EXAMPLE 7

The same adhesion test as was used in Example 3 was repeated except that a copolymerized nylon (melting point 213° C, relative viscosity ($\eta\gamma$) 1.70) prepared by polymerizing a mixture of 90 parts of the nylon salt of 1,6-hexamethylene diamine and 1,12-dodecanedioic acid and 10 parts of ω-lauryllactam in a conventional manner was used. The results are shown in Table 1.

EXAMPLE 8

The same adhesion test as in Example 3 was repeated except that non-treated steel plates 0.17 mm thick were used in place of chromic acid-treated steel plates. The results are shown in Table 1.

EXAMPLE 9

The same adhesion test as in Example 3 was repeated except that thin nickel-plated steel foils 0.17 mm thick were used in place of the chromic acid-treated steel plates. The results are shown in Table 1.

EXAMPLE 10

The same adhesion test as in Example 3 was repeated except that chromic acid-treated steel plates coated with a heat-setting polyvinyl butyral-epoxy-phenol resin coating material (a mixture of 20 parts of a polyvinyl butyral resin (Denka Polyvinyl Butyral 2,000; a product of Denki Kagaku Kogyo K.K.), 40 parts of a bisphenol A epoxy resin (Epikote 1007; a product of Shell International Chemicals Corp.) and 40 parts of an o-cresol-p-cresol-phenolic resol resin (1:1:1 by weight) which is prepared by condensing the above components in the presence of formaldehyde and an alkaline catalyst in a conventional manner; dissolved in a mixed solution of methyl cellosolve and xylene (1:1 by weight) to obtain a coating composition having a concentration of 20%) in a thickness of 5 μ as the coating material was used. The coating was cured at a temperature of 200° C for 10 minutes.

EXAMPLES 11 to 16

A blend of (A) nylon 11 (melting point 186° C, relative viscosity ($\eta\gamma$) 1.78), (B) nylon 12 (melting point 176° C, relative viscosity ($\eta\gamma$) 1.68), (C) nylon 6–12 (melting point 215° C, relative viscosity ($\eta\gamma$) 1.73), and polyethylene, i.e., high-pressure method low-density polyethylene having a melt index of 1.0 g/10 min. (ASTM D1236), a density of 0.919 g/cm$^3$, and a softening point of 95° C, was fabricated into a film 100 μ thick by a film-molding means. In Examples 11 to 16, 0 part, 0.3 part, 1 part, 3 parts, 5 parts, or 10 parts of the polyethylene was added, respectively, to 100 parts of a mixture of nylon 11, nylon 12, and nylon 6–12.

To evaluate the adhesive strength and heat resistance of the adhesive films thus prepared, lacquered steel plates prepared by coating chromic acid-treated steel plates 0.17 mm thick (Cansuper, trade name of Shin Nihon Seitetsu K.K.) with the epoxy-phenol of Examples 1 to 4 at a thickness of 5 μ and curing the coating by heating for 10 minutes at 205° C were used. An adhesion test was carried out in the same manner as in Examples 1 to 4 (in this case, however, the pressing time by the hot plates was 5 seconds). The results are shown in Table 2.

Furthermore, in the examples, to evaluate the heat resistance, the bonded samples were aged for 15 minutes at 170° C, cooled, and then the T-friction strength measured.

EXAMPLES 17 TO 18

The same adhesion test as in Example 11 was repeated except that a blend of 100 parts of the mixture of nylon 11, nylon 12, and nylon 6–12 at a weight ratio of 70:30:10 as in Example 11 and 1 part or 3 parts of Surlyn 1555 (trade name of the ionomer prepared by subjecting an ethylene-methacrylic acidbase copolymer to ion-cross-linking with Na$^+$) having a density of 0.94 g/cm$^3$, a melt index of 10.0 g/10 min (ASTM D1238), and a Vicat softening point of 70° C (ASTM D1525) was used as the adhesive composition in Exam- Table 1

| | Composition ratio of nylon 11: nylon 12 (weight) | Amount of nylon 6–12 per 100 parts of nylon 11 and nylon 12* | T-friction strength** (Kg/inch, n=5) | | 100° C (after aging in water for 3 hrs. at 130° C) | Low-temperature adhesive property-A (160° C) |
|---|---|---|---|---|---|---|
| | | | Measurement Temp. (25° C) | Measurement Temp. (100° C) | | |
| Comparison Example 1 | 60:40 | 0 | 45.0 | 27.6 | 23.2 | X |
| Example 2 | " | 2.5 | 50.5 | 32.6 | 30.2 | O |
| Example 3 | " | 5 | 51.0 | 34.1 | 30.8 | O |
| Example 4 | " | 10 | 52.5 | 35.7 | 33.5 | O |
| Example 5 | " | 25 | 48.0 | 32.3 | 28.7 | O |
| Comparison Example 2 | " | 50 | 30.3 | 21.6 | 16.8 | O |
| Example 3 | 100:0 | 10 | 40.8 | 24.5 | 22.3 | X |
| Example 5 | 80:20 | 10 | 53.5 | 34.6 | 32.1 | O |
| Example 6 | 30:70 | 10 | 50.7 | 32.1 | 28.7 | O |
| Comparison Example 4 | 0:100 | 10 | 37.5 | 21.1 | 20.8 | X |
| Example 5 | 100:0 | 0 | 27.5 | 16.3 | 9.0 | X |
| Example 6 | 0:100 | 0 | 27.3 | 13.1 | 6.6 | X |
| Example 7 | 60:40 | 10*¹ | 51.0 | 32.5 | 29.4 | O |
| Example 8 | " | 10 | 51.5 | 34.8 | 33.0 | O |
| Example 9 | " | 10 | 52.7 | 32.0 | 30.8 | O |
| Example 10 | " | 10 | 50.5 | 30.3 | 28.5 | O |

*where only nylon 11 or nylon 12 was used, the basis is per the 100 parts of nylon 11 or 12, depending on the case
*¹Nylon 6–12/nylon 12 (90/10) copolymer nylon
**Mean value of the maximum value of each data obtained by measuring 5 times.
"O" in the above Table means that the nylon film tested firmly adhered to the metal under the low temperature adhesion test at 160° C.
"X" means that the nylon film tested did not adhere to the metal under the low temperature adhesion test at 160° C.

ple 17 or 18, respectively. The results are shown in Table 2.

EXAMPLE 19

The same adhesion test as in Example 17 was repeated except that Surlyn 1650 (trade name of the ionomer prepared by subjecting an ethylene-methacrylic acid copolymer to ion-cross-linking with $Zn^{++}$, made by E. I. Du Pont De Nemours & Co.) having a density of 0.95 g/cm³, a melt index of 2.0 g/10 min, and a Vicat softening point of 75° C was used as the ionomer (Surlyn 1555). The results are shown in Table 2.

EXAMPLE 20

The same adhesion test as in Example 11 was repeated except that a blend of 100 parts of the mixture of nylon 11, nylon 12, and nylon 6–12 in a weight ratio of 70:30:10 as in Example 11, 3 parts of a polyethylene, Showrex 6050 (trade name of a moderate processure process high-density polyethylene, made by Showa Yuka K.K), having a density of 0.960 g/cm³, a melt index of 5.0 g/10 min (ASTM D1238), and a softening point of 127° C), and 0.5 part of Surlyn 1560 (trade name of the ionomer prepared by subjecting an ethylene-methacrylic acid copolymer to crosslinking with $Na^+$, having a density of 0.96 g/cm³, a melt index of 5.0 g/10 min (ASTM D1238), and a Vicat softening point of 63° C) as an ionomer was used as the adhesive composition. The results are shown in Table 2.

EXAMPLE 21

The same adhesion test as in Example 11 was repeated except that a blend of nylon 11 (melting point 186° C, relative viscosity ($\eta\gamma$) 1.74), a polyamide (melting point 175° C, relative viscosity 1.69, heat of dissolution of crystals 98% that of the corresponding homopolymer of nylon 12) prepared by polymerizing 97 parts of nylon 12 ($\omega$-lauryllactam) and 3 parts of $\omega$-caprolactam, and nylon 6–12 (melting point 215° C, relative viscosity 1.71) in a weight ratio of 50:50:10 was used as the adhesive composition. The results are shown in Table 2.

EXAMPLE 22

The same adhesion test as in Example 21 was repeated except that a blend of 100 parts of the mixture of nylon 11, nylon 12, and nylon 6–12 in a weight ratio of 50:50:10 as in Example 21 and 3 parts of Hizex 2200J (trade name of a low pressure process polyethylene, made by Mitsui Sekiyu Kagaku K.K., having a melt index of 5.5 dg/min., a density of 0.968 g/cm³, a Vicat softening point of 124° C, and a melting point of 134° C) was used as the adhesive composition. The results are shown in Table 2.

EXAMPLE 23

The same adhesion test as in Example 21 was repeated using a blend of 100 parts of the mixture of nylon 11, nylon 12, and nylon 6–12 in a weight ratio of 50:50:10 as in Example 21 and 1 part of Surlyn 1555 (trade name, made by E. I. du Pont Nemours & Co.) as the adhesive composition. The results are shown in Table 2.

EXAMPLES 24 to 27

The same adhesion test as in Example 22 was repeated using the monomer components as shown in Table 3 as the copolymeric component of nylon 12 in Example 22. The results are shown in Table 2.

Table 2

| Example | Nylon | Nylon | Nylon | Weight ratio of nylon (A): nylon (B): nylon (C) | Amount of polyethylene per 100 parts of nylons | Amount of ionomer per 100 parts of nylons | T-friction strength (Kg/inch) Measurement temp. 25° C | 100° C | Strength at 100° C after aging in water for 3 hrs. at 130° C | Strength at 25° C after aging in air for 15 min. at 170° C | Low-temp. adhesive property -A 160° C) |
|---|---|---|---|---|---|---|---|---|---|---|---|
| 11 | 11 | 12 | 6–12 | 70:30:10 | — | — | 53.2 | 34.1 | 33.0 | 34.0 | O |
| 12 | " | " | " | " 0.3 | 0.3 | — | 53.9 | 36.5 | 33.5 | 45.5 | O |
| 13 | " | " | " | " | 1 | — | 53.7 | 37.3 | 34.3 | 48.9 | O |
| 14 | " | " | " | " | 3 | — | 55.2 | 39.5 | 35.1 | 50.3 | O |
| 15 | " | " | " | " | 5 | — | 56.3 | 37.1 | 32.4 | 52.5 | O |
| 16 | " | " | " | " | 10 | — | 55.7 | 35.3 | 30.8 | 51.3 | O |
| 17 | " | " | " | " | — | 1 | 54.0 | 34.5 | 30.8 | 38.0 | O |
| 18 | " | " | " | " | — | 3 | 52.8 | 33.5 | 32.5 | 40.2 | O |
| 19 | " | " | " | " | — | 1 | 52.0 | 33.5 | 28.4 | 40.0 | O |
| 20 | " | " | " | " | 3 | 0.5 | 56.3 | 40.0 | 37.3 | 51.2 | O |
| 21 | " | 12/6* | " | 50:50:10 | — | — | 53.8 | 33.1 | 28.3 | 35.3 | O |
| 22 | " | " | " | " | 3 | — | 58.7 | 38.8 | 34.1 | 53.0 | O |
| 23 | " | " | " | " | — | 1 | 53.5 | 34.3 | 30.0 | 40.7 | O |
| 24 | " | 12/6–6 | " | " | 3 | — | 54.5 | 33.8 | 30.3 | 49.6 | O |
| 25 | " | 12/6–10 | " | " | " | — | 53.1 | 37.8 | 36.0 | 48.2 | O |
| 26 | " | 12/6–12 | " | " | " | — | 56.8 | 39.8 | 36.5 | 47.9 | O |
| 27 | " | 12/11 | " | " | " | — | 52.5 | 36.1 | 32.1 | 43.8 | O |
| 28 | " | 12/6 | " | " | 2 | 1 | 54.1 | 32.8 | 29.8 | 44.3 | O |

*nylon 12/6 is a copolymer of $\omega$-lauryllactam and $\omega$-caprolactam.
"O" in the above Table means that the nylon film tested firmly adhered to the metal under the low temperature adhesion test at 160° C.

Table 3

| Example | Comonomer | Comonomer/ $\omega$-lauryllactam (wt. ratio) | Relative viscosity ($\eta\gamma$) |
|---|---|---|---|
| 24 | Nylon salt* of 1,6-hexamethylene diamine and adipic acid | 2.5/97.5 | 1.62 |
| 25 | Nylon salt* of 1,6-hexamethylene diamine and sebacic acid | 3.0/97.0 | 1.78 |
| 26 | Nylon salt* of 1,6-hexamethylene diamine and 1,12-dodecanedioic acid | 1.0/99.0 | 1.65 |
| 27 | 11-Aminoundecanoic acid | 4/96.0 | 1.75 |

*1:1 molar

EXAMPLE 28

The same adhesion test as in Example 27 was repeated using a blend of 100 parts of the mixture of nylon 11, nylon 12, and nylon 6–12 in a weight ratio of 50:50:10 as in Example 21, 2 parts of a polyethylene (Hizex 2200 J high density polyethylene having a melt index of 5 g/10 min.), and 1 part of an ionomer (Suryln 1555) as the adhesive composition. The results are shown in Table 2.

While the invention has been described in detail and with reference to specific embodiments thereof, it will be apparent to one skilled in the art that various changes and modifications can be made therein without departing from the spirit and scope thereof.

What is claimed is:

1. A polyamide adhesive composition for metal bonding comprising an 11-aminoundecanoic acid polycondensate, a 12-aminododecanoic acid polycondensate and a hexamethylenediamine-1,12-dodecanoic diacid polycondensate, wherein said composition consists essentially of:
   a. 100 parts by weight of a mixture of a crystalline 11-aminoundecanoic acid polycondensate and a crystalline 12-aminododecanoic acid polycondensate in a weight ratio of 95 : 5 to 5 : 95; and
   b. 2 to 40 parts by weight of a crystalline hexamethylene-diamine-1,12-dodecanoic diacid polycondensate, optionally with conventional additives.

2. The adhesive composition as claimed in claim 1, wherein said composition further contains 0.1 to 20 parts by weight of polyethylene per 100 parts by weight of said composition.

3. The adhesive composition as claimed in claim 1, wherein said composition further contains 0.1 to 20 parts by weight of an ionomer per 100 parts by weight of said composition.

4. The adhesive composition as claimed in claim 1, wherein said composition further contains 0.1 to 20 parts by weight of polyethylene and 0.1 to 20 parts by weight of an ionomer per 100 parts by weight of said composition.

5. The adhesive composition as claimed in claim 1, wherein at least one of said 11-aminoundecanoic acid polycondensate and said 12-aminododecanoic acid polycondensate is a crystalline copolymer polyamide having less than 5% by weight of a different polyamide-forming repeating unit as a comonomer.

6. The adhesive composition as claimed in claim 1, wherein said hexamethylenediamine-1,12-dodecanoic diacid polycondensate is a crystalline copolymer amide having less than 10% by weight of a different polyamide-forming repeating unit as a comonomer.

7. The adhesive composition as claimed in claim 1, wherein said 11-aminoundecanoic acid polycondensate and said 12-aminondodecanoic acid polycondensate have a relative viscosity ($\eta\gamma$) measured at 25° C in 100 ml of cresol having dissolved therein 0.4 g of the polycondensate of from about 1.3 to about 2.5.

8. The adhesive composition as claimed in claim 2, wherein said hexamethylenediamine-1,12-dodecanoic acid polycondensate has a relative viscosity, measured under the conditions defined in claim 2, of from about 1.3 to about 2.5.

9. The adhesive composition as claimed in claim 2, wherein said polyethylene has a specific gravity of about 0.92 to about 0.96, a mean molecular weight of about 20,000 to about 80,000, and a softening point of about 90° to about 130° C.

10. The adhesive composition as claimed in claim 3, wherein said ionomer has a density of 0.94 to 0.96 g/cm², a Vicat softening point (ASTM D1528) of 59° to 85° C and a melt index (ASTM D1238) of 0.7 to 360.

11. An adhesive as claimed in claim 4, wherein said polyethylene has a specific gravity of about 0.92 to about 0.96, a mean molecular weight of about 20,000 to about 80,000, and a softening point of about 90° to about 130° C and further wherein said ionomer has a density of 0.94 to 0.96 g/cm², a Vicat softening point (ASTM D1528) of 50° to 85° C and a melt index (ASTM D1238) of 0.7 to 360.

* * * * *